United States Patent
Sahib et al.

(10) Patent No.: US 12,155,759 B2
(45) Date of Patent: Nov. 26, 2024

(54) CLOUD KEY ACCESS MECHANISM

(71) Applicant: Intel Corporation, Santa Clara, CA (US)

(72) Inventors: Anees Azad Sahib, Bangalore (IN); Veena Saini, Rajasthan (IN)

(73) Assignee: Intel Corporation, Santa Clara, CA (US)

( * ) Notice: Subject to any disclaimer, the term of this patent is extended or adjusted under 35 U.S.C. 154(b) by 386 days.

(21) Appl. No.: 17/545,224

(22) Filed: Dec. 8, 2021

(65) Prior Publication Data
US 2022/0103358 A1    Mar. 31, 2022

(51) Int. Cl.
*H04L 9/08* (2006.01)
*H04L 9/14* (2006.01)
*H04L 9/32* (2006.01)

(52) U.S. Cl.
CPC .......... *H04L 9/0894* (2013.01); *H04L 9/0819* (2013.01); *H04L 9/14* (2013.01); *H04L 9/3213* (2013.01)

(58) Field of Classification Search
CPC ....... H04L 9/0894; H04L 9/0819; H04L 9/14; H04L 9/3213
USPC ........................................................ 713/159
See application file for complete search history.

(56) References Cited

U.S. PATENT DOCUMENTS

| | | | | |
|---|---|---|---|---|
| 11,601,402 | B1 * | 3/2023 | Delaney | H04L 63/0823 |
| 2007/0258587 | A1 * | 11/2007 | Harada | H04N 21/4367 |
| | | | | 380/201 |
| 2011/0271115 | A1 * | 11/2011 | Adams | H04L 63/0823 |
| | | | | 380/278 |
| 2014/0019753 | A1 * | 1/2014 | Lowry | H04L 9/0894 |
| | | | | 713/155 |
| 2017/0034554 | A1 * | 2/2017 | Tang | H04N 21/2747 |
| 2017/0331628 | A1 * | 11/2017 | Adams | H04L 9/0822 |
| 2019/0236029 | A1 * | 8/2019 | Butcher | G06F 12/0246 |
| 2020/0028879 | A1 * | 1/2020 | Lahiri | H04L 63/205 |
| 2021/0218722 | A1 | 7/2021 | Gaylor et al. | |
| 2021/0326270 | A1 * | 10/2021 | Zou | G06F 3/0626 |
| 2021/0374234 | A1 | 12/2021 | Bursell et al. | |
| 2022/0014358 | A1 * | 1/2022 | Retaureau | H04L 63/06 |
| 2023/0121502 | A1 * | 4/2023 | Lu | H04L 9/0866 |
| | | | | 380/46 |
| 2023/0180007 | A1 * | 6/2023 | Keum | H04W 12/04 |
| | | | | 713/1 |

OTHER PUBLICATIONS

EP Publication Notice for EP22205097.3, mailed May 17, 2023, 2 pages.
Extended EP Search Report for EP22205097.3, Apr. 4, 2023, 8 pages.
CN Publication Notice for CN202211389517.5, mailed Jun. 26, 2023, 23 pages.

* cited by examiner

*Primary Examiner* — Thanh T Le

(74) *Attorney, Agent, or Firm* — Jaffery Watson Mendonsa & Hamilton LLP

(57) ABSTRACT

An apparatus comprising one or more processors to receive a first request from an application to access one or more cryptographic keys from a cloud key vault, transmit the first request to the cloud key vault, receive the cryptographic keys from the cloud key vault, provide access to the one or more cryptographic keys to the application and store the one or more cryptographic keys within a trusted execution environment.

19 Claims, 8 Drawing Sheets

CLOUD KEY ACCESS MECHANISM

BACKGROUND OF THE DESCRIPTION

Applications are increasingly using cloud hosted key management (or key vault services) to store cryptographic keys in the cloud. Key vault services offload the management of keys from local out applications in which the applications are typically required to initiate fresh sessions with a key vault service. This has two main drawbacks. First, the live transportation of the keys (although in an encrypted format) presents an attack surface. Second, there is also a latency implication if the keys have to be retrieved from the remote service every time they are needed by the application.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only typical embodiments and are therefore not to be considered limiting of its scope, for the disclosure may admit other equally effective embodiments.

DETAILED DESCRIPTION

In the following description, numerous specific details are set forth to provide a more thorough understanding. However, it will be apparent to one of skill in the art that the embodiments may be practiced without one or more of these specific details. In other instances, well-known features have not been described in order to avoid obscuring the embodiments.

In embodiments, a mechanism is provided to access cryptographic keys from a remote key vault service by redirecting key access request to a local platform trusted execution environment (TEE).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Figure 1:
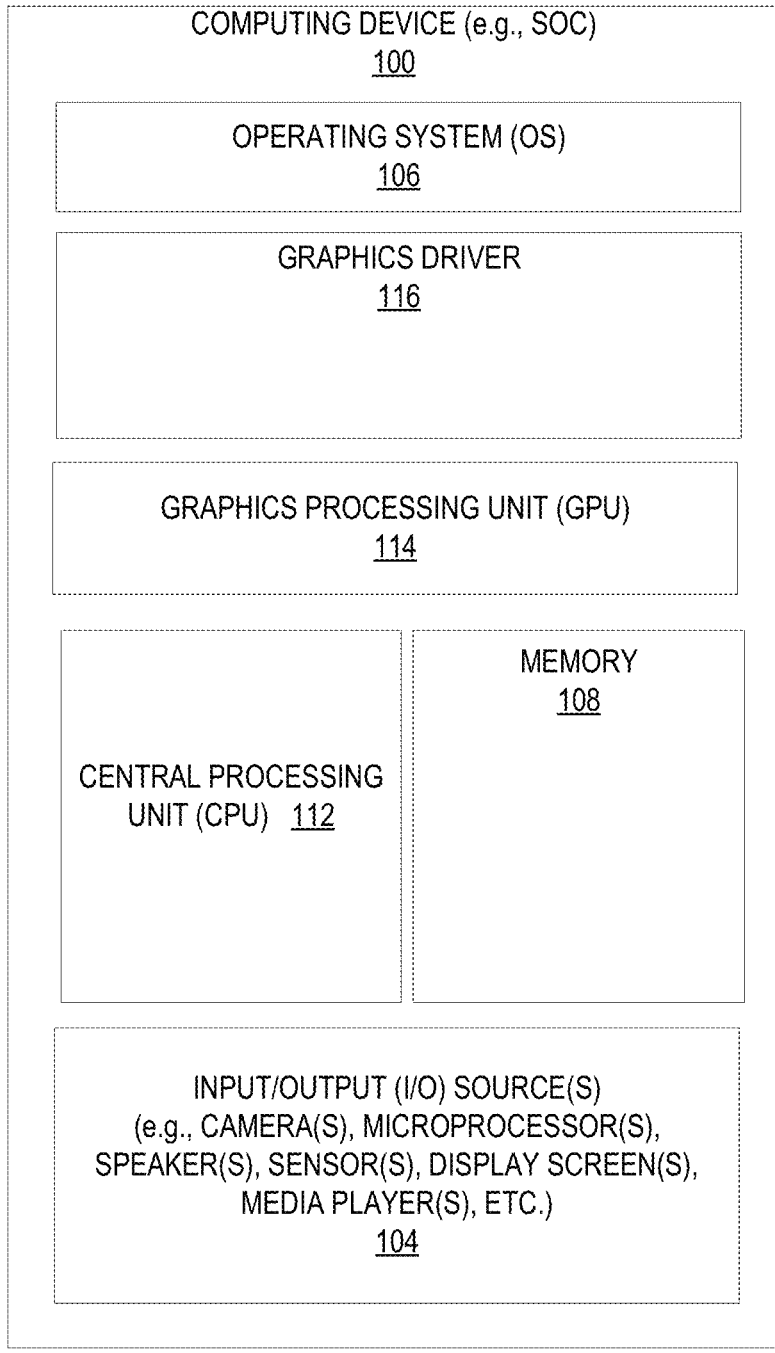
FIG. 1 illustrates one embodiment of a computing device.

FIG. 1 illustrates one embodiment of a computing device 100. According to one embodiment, computing device 100 comprises a computer platform hosting an integrated circuit ("IC"), such as a system on a chip ("SoC" or "SOC"), integrating various hardware and/or software components of computing device 100 on a single chip. As illustrated, in one embodiment, computing device 100 may include any number and type of hardware and/or software components, such as (without limitation) graphics processing unit 114 ("GPU" or simply "graphics processor"), graphics driver 116 (also referred to as "GPU driver", "graphics driver logic", "driver logic", user-mode driver (UMD), UMD, user-mode driver framework (UMDF), UMDF, or simply "driver"), central processing unit 112 ("CPU" or simply "application processor"), memory 108, network devices, drivers, or the like, as well as input/output (I/O) sources 104, such as touchscreens, touch panels, touch pads, virtual or regular keyboards, virtual or regular mice, ports, connectors, etc. Computing device 100 may include operating system (OS) 106 serving as an interface between hardware and/or physical resources of computing device 100 and a user.

It is to be appreciated that a lesser or more equipped system than the example described above may be preferred for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or a combination thereof, such as firmware.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

Figure 2:
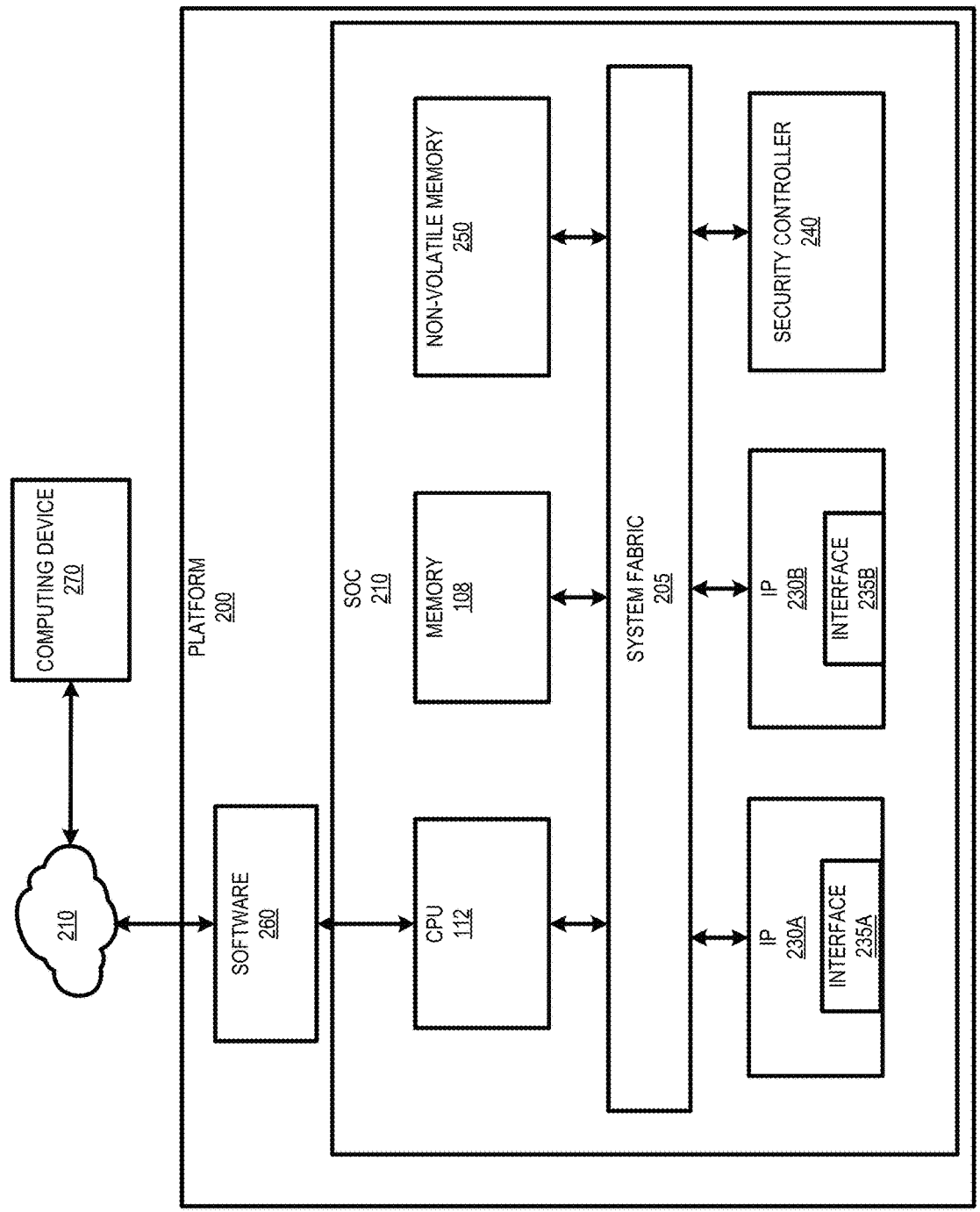
FIG. 2 illustrate embodiments of a platform.

FIG. 2 illustrates one embodiment of a platform 200 including a SOC 210 similar to computing device 100 discussed above. As shown in FIG. 2, platform 200 includes SOC 210 communicatively coupled to one or more software components 260 via CPU 112. In a further embodiment, platform 200 may also be coupled to a computing device 270 via a cloud network 210. In this embodiment, computing device 270 comprises a cloud agent that is provided access to SOC 210 via software 260.

Additionally, SOC 210 includes other computing device components (e.g., memory 108) coupled via a system fabric 205. In one embodiment, system fabric 205 comprises an integrated on-chip system fabric (IOSF) to provide a standardized on-die interconnect protocol for coupling interconnect protocol (IP) agents 230 (e.g., IP blocks 230A and 230B) within SOC 210. In such an embodiment, the interconnect protocol provides a standardized interface to enable third parties to design logic such as IP agents to be incorporated in SOC 210.

According to embodiment, IP agents 230 may include general purpose processors (e.g., in-order or out-of-order cores), fixed function units, graphics processors, I/O controllers, display controllers, etc. In such an embodiment, each IP agent 230 includes a hardware interface 235 (e.g., 235A and 235B) to provide standardization to enable the IP agent 230 to communicate with SOC 210 components. For example, in an embodiment in which IPA agent 230 is a third party visual processing unit (VPU), interface 235 provides a standardization to enable the VPU to access memory 108 via fabric 205.

SOC 210 also includes a security controller 240 that operates as a security engine to perform various security operations (e.g., security processing, cryptographic functions, etc.) for SOC 210. In one embodiment, security controller 240 comprises a cryptographic processor IP agent 230 implemented to perform the security operations. Further, SOC 210 includes a non-volatile memory 250. Non-volatile memory 250 may be implemented as a Peripheral Component Interconnect Express (PCIe) storage drive, such as a solid-state drive (SSD) or Non-Volatile Memory Express (NVMe) drives.

According to one embodiment, platform 200 may be implemented as a trusted execution environment (TEE). A TEE is a secure area of platform 200 that guarantees code and data loaded within platform 200 are protected with respect to confidentiality and integrity, Additionally, TEE is an isolated execution environment that provides security features such as isolated execution and integrity of applications executing with the TEE, along with confidentiality of their assets, Thus, the TEE offers an execution space that provides a higher level of security for trusted applications operating on platform 200.

Figure 3:
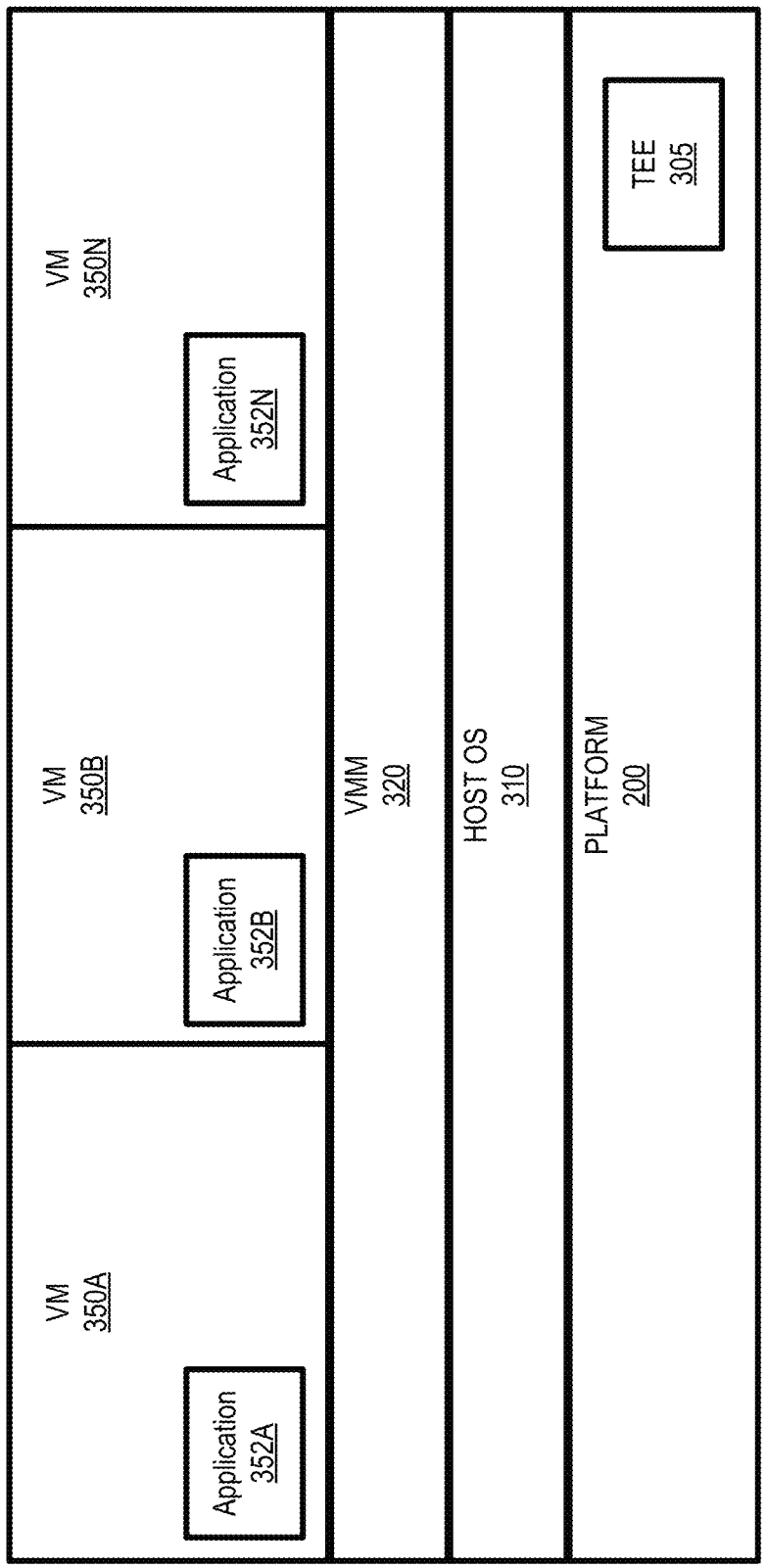
FIG. 3 illustrates another embodiment of a platform.

FIG. 3 illustrates an embodiment of platform 200 including a TEE 305. In this embodiment, platform 200 is also implemented to execute a plurality of virtual machines (VMs) 350 (e.g., VM 350A-VM 350N) via a host OS 310 and virtual machine monitor (VMM) 320. VMs 350 enable the virtualization of platform 200 resources. VMM 320 presents VMs 350 with a virtual operating platform and manages the execution of VMs 350. In one embodiment, applications 352 executing on a VM 350 (e.g., applications 352A-352N) may implement a key vault service to manage cryptographic keys. In such an embodiment, an application 352 accesses keys from an active directory service. An active directory service stores information about members of a domain (e.g., devices and users), verifies their credentials and defines their access rights. The server running this service is called a domain controller. A domain controller is contacted when a user logs into a device or accesses another device across the network.

Figure 4:
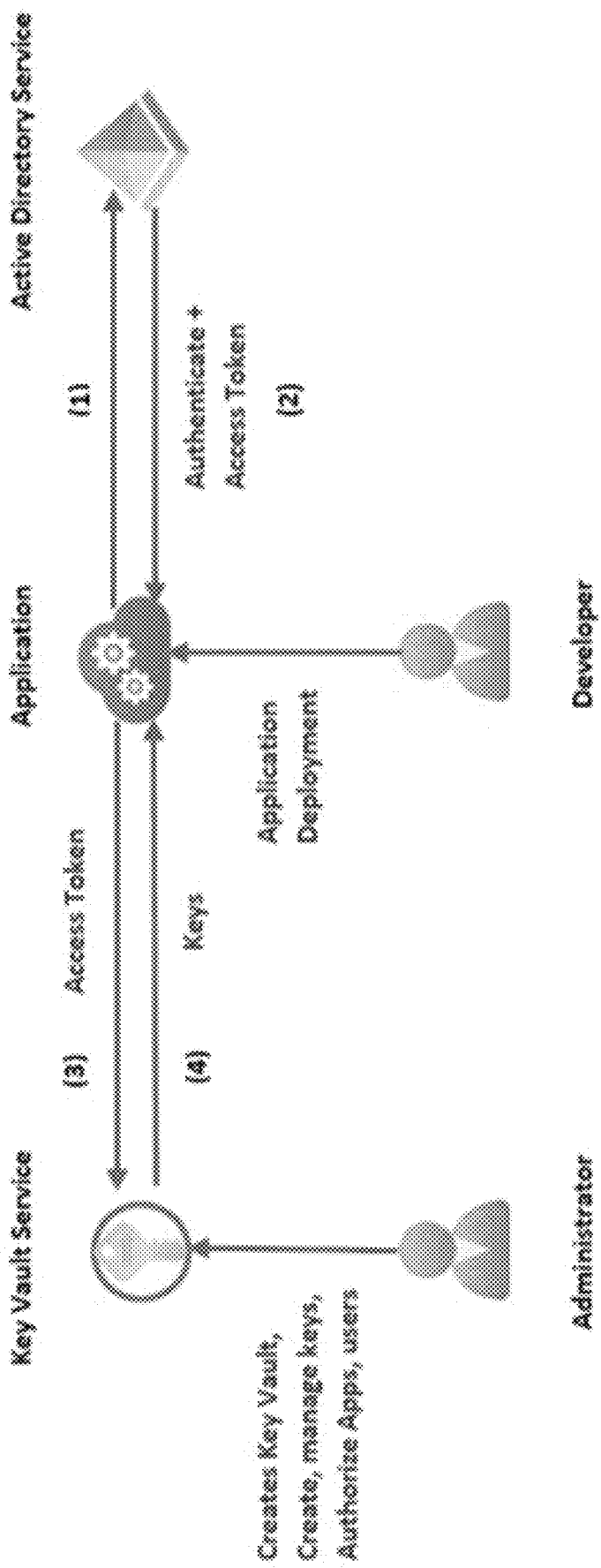
FIG. 4 illustrates a conventional key access model.

FIG. 4 illustrates a conventional key access model. As shown in FIG. 4, an authentication request is transmitted to the active directory service, which maintains authentication data for application developers and administrators. On successful authentication, the application receives a key access token from the active directory service. These two steps are required only for the first-time key access. For subsequent key accesses, the same key access token can be used. After acquiring the access token, the application will send a request to the key vault service (e.g., via a Representational state transfer (REST) application programming interface (API)). The key vault service may then redirect the request to a valid key vault Uniform Resource Locator (URL) and transmits the keys back to the application (Step 4).

The above-described key access model is more suitable when both the application and its relevant keys are in the same data center. However, such a model is not adequate for a hybrid cloud model in which applications may be operating within a private cloud (for e.g., an enterprise cloud), while the keys are maintained with a Content Security Policy provided vault. In such a scenario, the latency incurred by the application during remote key access could present a significant QoS impact, in addition to exposing an attack surface when the keys are in transit.

Figure 5:
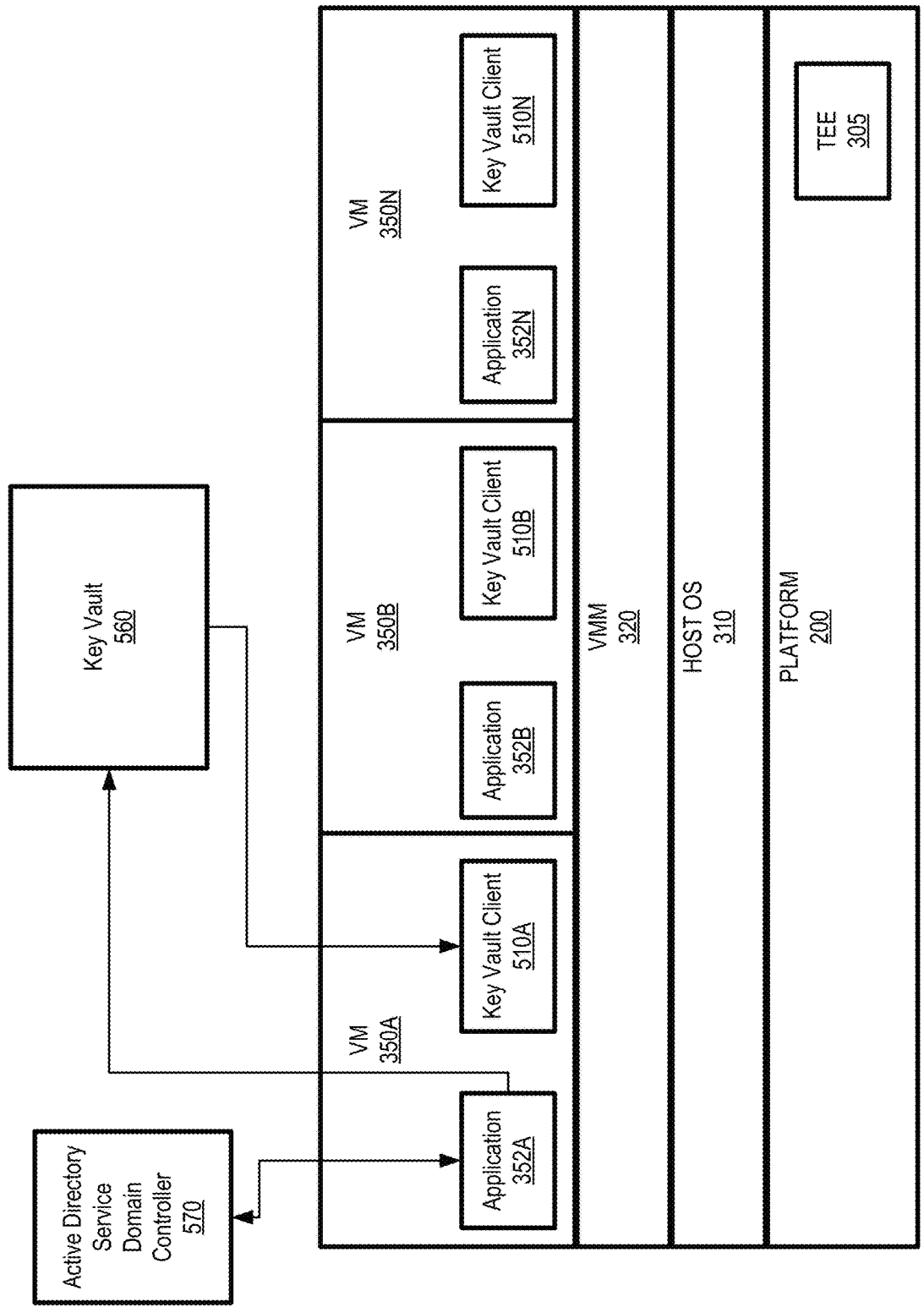
FIG. 5 illustrates yet another embodiment of a platform.

According to one embodiment, a hybrid cloud key access system is disclosed, which utilizes the platform TEE 305 in conjunction with a remote cloud key vault service. FIG. 5 illustrates another embodiment of platform 200 communicatively coupled to a key vault 560 and an active directory service domain controller (or domain controller) 570. In one embodiment, key vault 560 comprises a key management service accessed via a cloud network. In such an embodiment, platform 200 is a client of key vault 560 that includes applications 352 that may access cryptographic keys via the hybrid cloud system using a key vault client 510 (e.g., 510A-510N). In such an embodiment, key access may be performed during a key provisioning phase and a key access phase.

In the key provisioning phase, which occurs for a first-time access, key vault client 510 receives the keys from key vault 560. Subsequently, key vault client 510 permits access of the keys to application 352 and saves the key in TEE 305. In one embodiment, the keys are transmitted from key vault 560 only during the key provisioning phase. Once the keys are successfully provisioned in TEE 305, key vault 560 will receive an acknowledgement and it will set a key_provisioned flag. Subsequently, the key vault 560 will utilize this flag for handling the subsequent key access requests.

Figure 6:
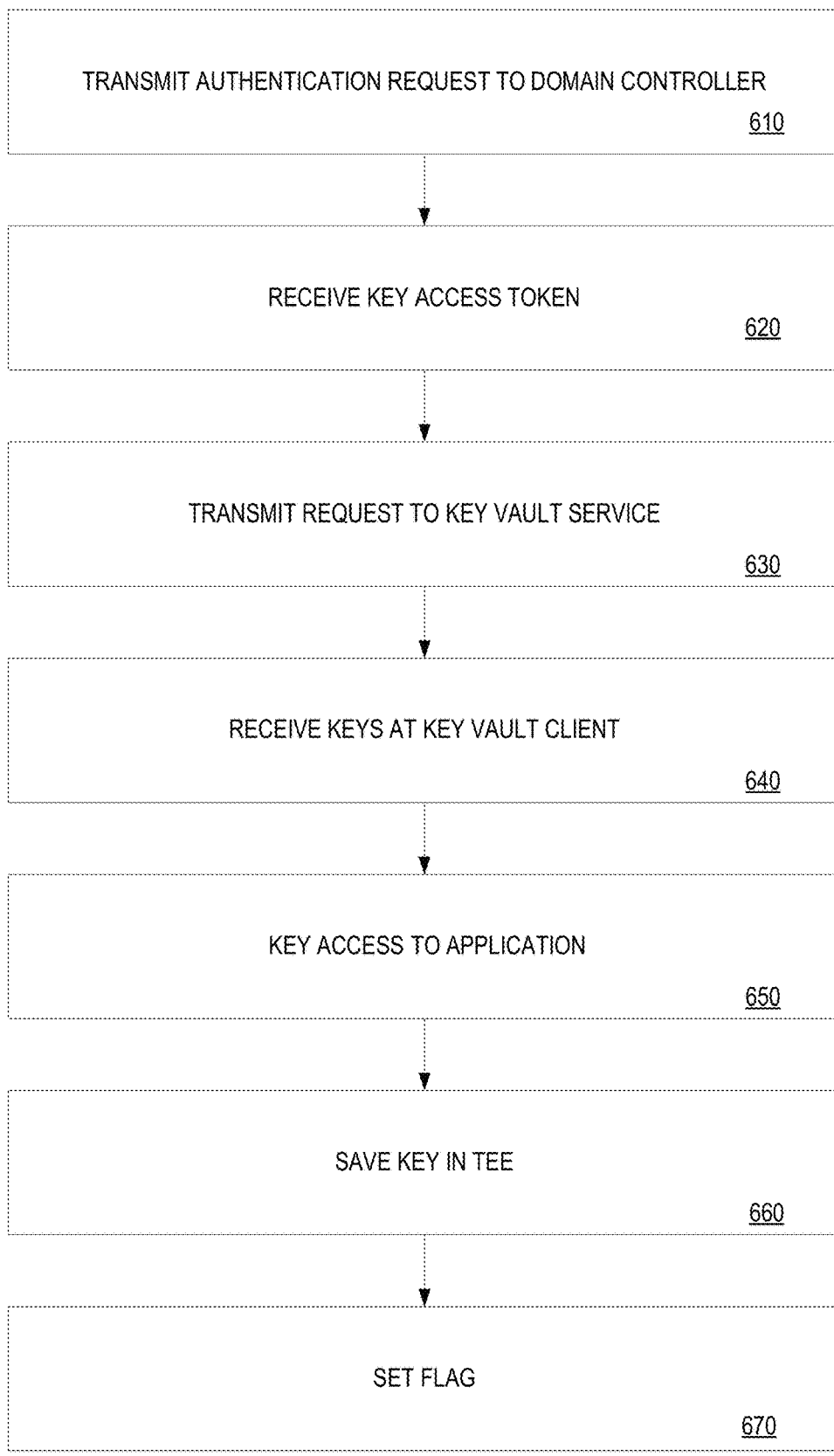
FIG. 6 is a flow diagram illustrating one embodiment of a key provisioning process.

FIG. 6 is a flow diagram illustrating one embodiment of the key provisioning process. At processing block 610, an application 352 (e.g., application 352a) transmits an authentication request to domain controller 570. At processing block 620, the application 352 receives a key access token from domain controller 570. At processing block 630, the application 352 transmits a request to key vault 560. At processing block 640, key vault client 510 receives the keys from key vault 560. At processing block 650, key vault client 510 provides access of the keys to application 352. At processing block 660, the keys are stored in TEE 305. At processing block 670, a key_provisioned flag is set at key vault 560 in response to receiving an acknowledgement that the keys have been successfully stored in TEE 305.

In the key access phase, the application 352 transmits a key access request to key vault 560. Subsequently, key vault 560 verifies the key_provisioned flag. Upon a determination that the flag is set, key vault 560 redirects the request to the key vault client 510. The key vault client 510 then fetches the keys from TEE 305 and supplies the keys to application 352. Upon a determination that the flag is not set (e.g., keys expired), the keys will have to be reprovisioned (e.g., via the above-described key provisioning process).

Figure 7:
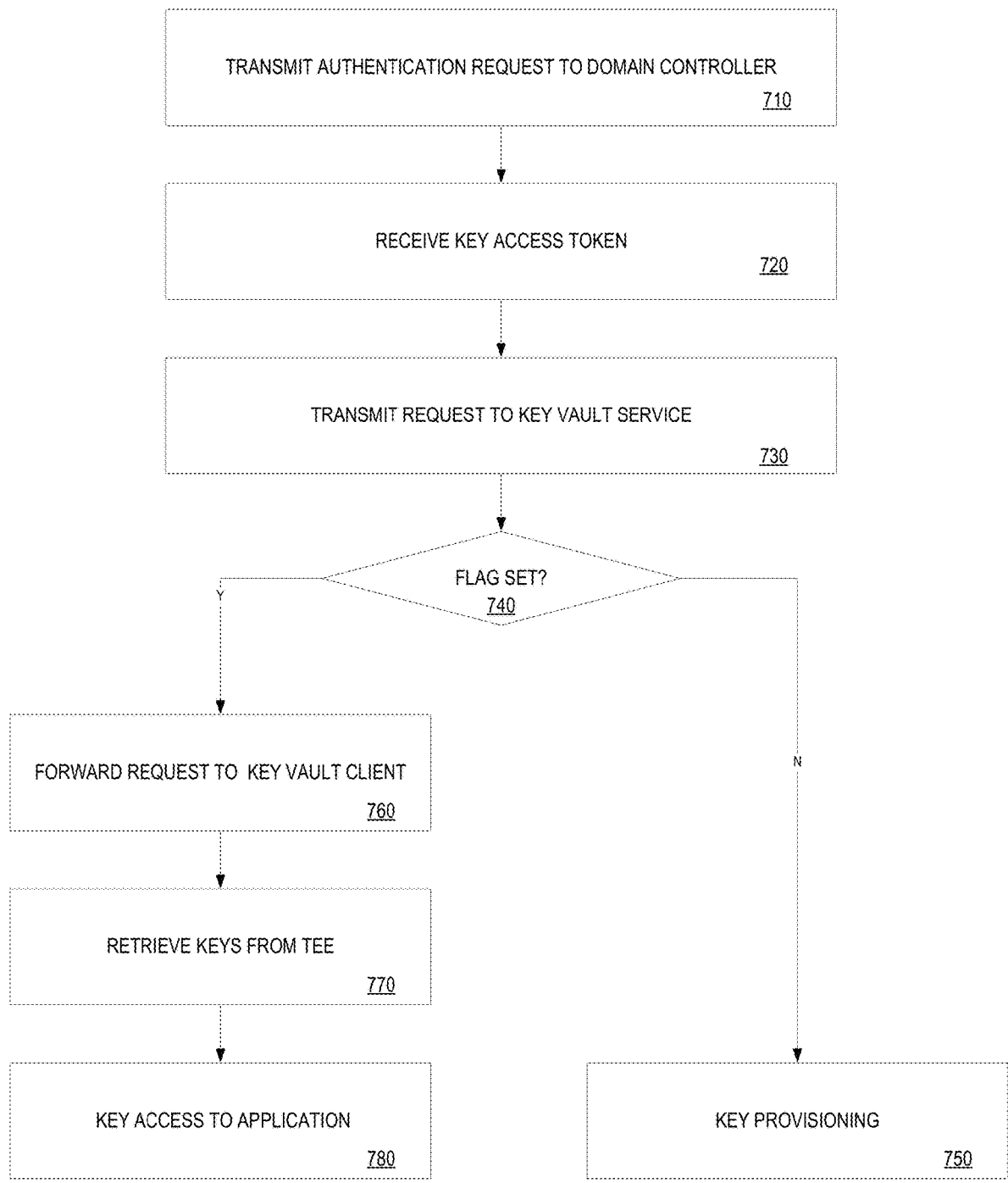
FIG. 7 is a flow diagram illustrating one embodiment of a key access process.

FIG. 7 is a flow diagram illustrating one embodiment of the key access process. At processing block 710, an application 352 transmits an authentication request to domain controller 570. At processing block 720, the application 352 receives a key access token from domain controller 570. At processing block 730, the application 352 transmits a request to key vault 560. At decision block 740, key vault 560 determines whether the key_provisioned flag associated with the application has been set. If not, the key provisioning process, as discussed above with reference to FIG. 6, is performed, processing block 750.

Upon a determination at decision block 740 that the key_provisioned flag has been set, key vault 560 redirects the key access request to key vault client 510, processing block 760. At processing block 770, key vault client 510 retrieves the keys from TEE 305. At processing block 780, key vault client 510 provides access of the keys to application 352.

The above-described hybrid cloud key access system reduces the latency incurred by the application during remote key access, thereby significantly improving QoS, in addition to improving the overall security by minimizing attack surfaces.

Figure 8:
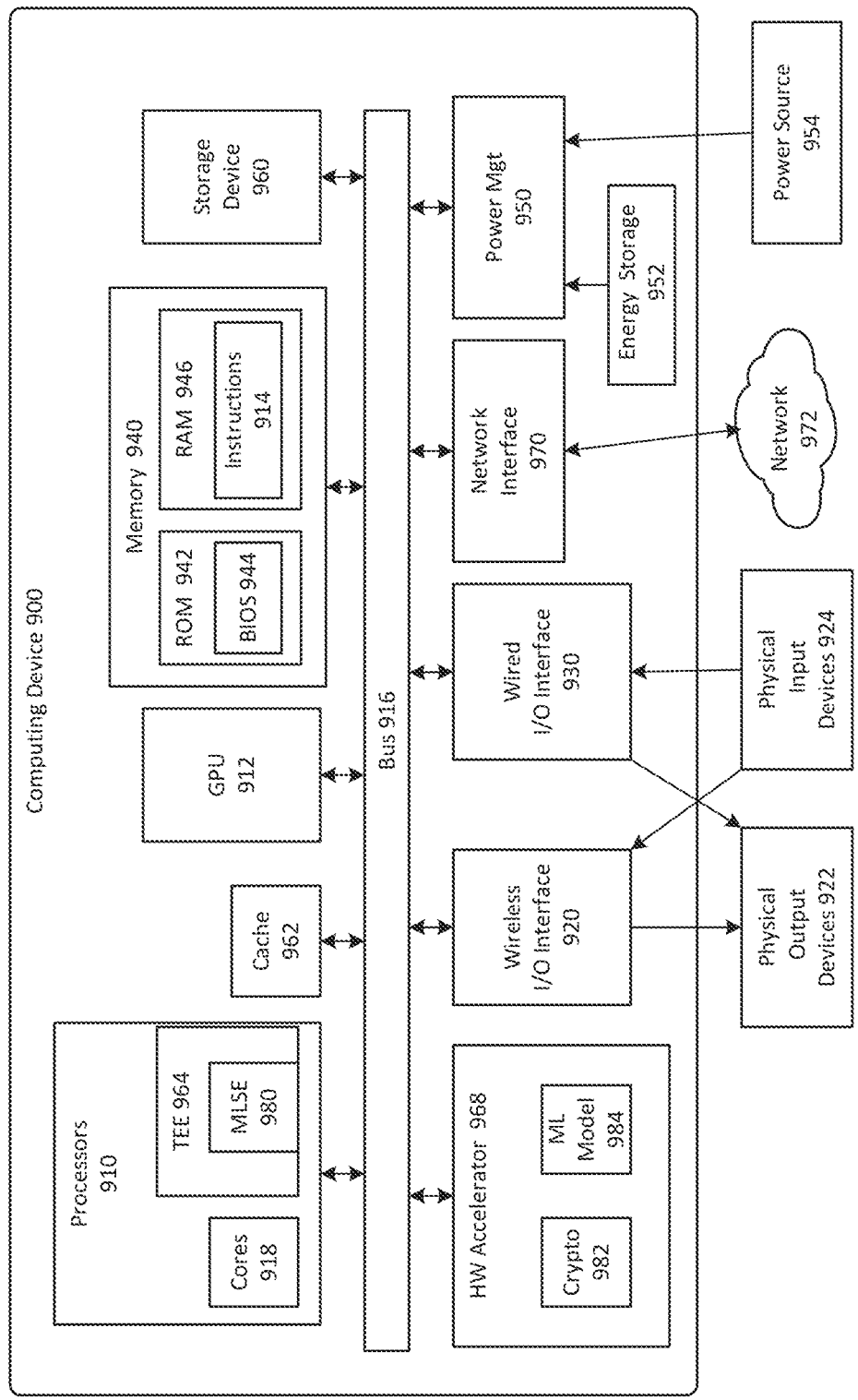
FIG. 8 is a schematic diagram of an illustrative electronic computing device.

FIG. 8 is a schematic diagram of an illustrative electronic computing device. In some embodiments, the computing device 900 includes one or more processors 910 including one or more processors cores 918 and a TEE 964, the TEE including a machine learning service enclave (MLSE) 980. In some embodiments, the computing device 900 includes a hardware accelerator 968, the hardware accelerator including a cryptographic engine 982 and a machine learning model 984. In some embodiments, the computing device is to provide enhanced protections against ML adversarial attacks, as provided in FIGS. 1-7.

The computing device 900 may additionally include one or more of the following: cache 962, a graphical processing unit (GPU) 912 (which may be the hardware accelerator in some implementations), a wireless input/output (I/O) interface 920, a wired I/O interface 930, memory circuitry 940, power management circuitry 950, non-transitory storage device 960, and a network interface 970 for connection to a network 972. The following discussion provides a brief, general description of the components forming the illustrative computing device 900. Example, non-limiting computing devices 900 may include a desktop computing device, blade server device, workstation, or similar device or system.

In embodiments, the processor cores 918 are capable of executing machine-readable instruction sets 914, reading data and/or instruction sets 914 from one or more storage devices 960 and writing data to the one or more storage devices 960. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 918 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 900 includes a bus or similar communications link 916 that communicably couples and facilitates the exchange of information and/or data between various system components including the processor cores 918, the cache 962, the graphics processor circuitry 912, one or more wireless I/O interfaces 920, one or more wired I/O interfaces 930, one or more storage devices 960, and/or one or more network interfaces 970. The computing device 900 may be referred to in the singular herein, but this is not intended to limit the embodiments to a single computing device 900, since in certain embodiments, there may be more than one computing device 900 that incorporates, includes, or contains any number of communicably coupled, collocated, or remote networked circuits or devices.

The processor cores 918 may include any number, type, or combination of currently available or future developed devices capable of executing machine-readable instruction sets.

The processor cores 918 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 8 are of conventional design. Consequently, such blocks need not be described in further detail herein, as they will be understood by those skilled in the relevant art. The bus 916 that interconnects at least some of the components of the computing device 900 may employ any currently available or future developed serial or parallel bus structures or architectures.

The system memory 940 may include read-only memory ("ROM") 642 and random access memory ("RAM") 946. A portion of the ROM 942 may be used to store or otherwise retain a basic input/output system ("BIOS") 944. The BIOS 944 provides basic functionality to the computing device 900, for example by causing the processor cores 918 to load and/or execute one or more machine-readable instruction sets 914. In embodiments, at least some of the one or more machine-readable instruction sets 914 cause at least a portion of the processor cores 918 to provide, create, produce, transition, and/or function as a dedicated, specific, and particular machine, for example a word processing machine, a digital image acquisition machine, a media playing machine, a gaming system, a communications device, a smartphone, or similar.

The computing device 900 may include at least one wireless input/output (I/O) interface 920. The at least one wireless I/O interface 920 may be communicably coupled to one or more physical output devices 922 (tactile devices, video displays, audio output devices, hardcopy output devices, etc.). The at least one wireless I/O interface 920 may communicably couple to one or more physical input devices 624 (pointing devices, touchscreens, keyboards, tactile devices, etc.). The at least one wireless I/O interface 920 may include any currently available or future developed wireless I/O interface. Example wireless I/O interfaces include, but are not limited to: BLUETOOTH®, near field communication (NFC), and similar.

The computing device 900 may include one or more wired input/output (I/O) interfaces 930. The at least one wired I/O interface 930 may be communicably coupled to one or more physical output devices 922 (tactile devices, video displays, audio output devices, hardcopy output devices, etc.). The at least one wired I/O interface 930 may be communicably coupled to one or more physical input devices 924 (pointing devices, touchscreens, keyboards, tactile devices, etc.). The wired I/O interface 930 may include any currently available or future developed I/O interface. Example wired I/O interfaces include, but are not limited to: universal serial bus (USB), IEEE 1394 ("FireWire"), and similar.

The computing device 900 may include one or more communicably coupled, non-transitory, data storage devices 960. The data storage devices 960 may include one or more hard disk drives (HDDs) and/or one or more solid-state storage devices (SSDs). The one or more data storage devices 960 may include any current or future developed storage appliances, network storage devices, and/or systems. Non-limiting examples of such data storage devices 960 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 960 may include one or more removable storage devices, such as one or more flash drives, flash memories, flash storage units, or similar appliances or devices capable of communicable coupling to and decoupling from the computing device 900.

The one or more data storage devices 960 may include interfaces or controllers (not shown) communicatively coupling the respective storage device or system to the bus 916. The one or more data storage devices 960 may store, retain, or otherwise contain machine-readable instruction sets, data structures, program modules, data stores, databases, logical structures, and/or other data useful to the processor cores 918 and/or graphics processor circuitry 912 and/or one or more applications executed on or by the processor cores 918 and/or graphics processor circuitry 912. In some instances, one or more data storage devices 960 may be communicably coupled to the processor cores 918, for example via the bus 916 or via one or more wired communications interfaces 930 (e.g., Universal Serial Bus or USB); one or more wireless communications interfaces 920 (e.g., Bluetooth®, Near Field Communication or NFC); and/or one or more network interfaces 970 (IEEE 802.3 or Ethernet, IEEE 802.11, or Wi-Fi®, etc.).

Processor-readable instruction sets 914 and other programs, applications, logic sets, and/or modules may be stored in whole or in part in the system memory 940. Such instruction sets 914 may be transferred, in whole or in part, from the one or more data storage devices 960. The instruction sets 914 may be loaded, stored, or otherwise retained in system memory 940, in whole or in part, during execution by the processor cores 918 and/or graphics processor circuitry 912.

The computing device 900 may include power management circuitry 950 that controls one or more operational aspects of the energy storage device 952. In embodiments, the energy storage device 952 may include one or more primary (i.e., non-rechargeable) or secondary (i.e., rechargeable) batteries or similar energy storage devices. In embodiments, the energy storage device 952 may include one or more supercapacitors or ultracapacitors. In embodiments, the power management circuitry 950 may alter, adjust, or control the flow of energy from an external power source 954 to the energy storage device 952 and/or to the computing device 900. The power source 954 may include, but is not limited to, a solar power system, a commercial electric grid, a portable generator, an external energy storage device, or any combination thereof.

For convenience, the processor cores 918, the graphics processor circuitry 912, the wireless I/O interface 920, the wired I/O interface 930, the storage device 960, and the network interface 970 are illustrated as communicatively coupled to each other via the bus 916, thereby providing connectivity between the above-described components. In alternative embodiments, the above-described components may be communicatively coupled in a different manner than illustrated in FIG. 8. For example, one or more of the above-described components may be directly coupled to other components, or may be coupled to each other, via one or more intermediary components (not shown). In another example, one or more of the above-described components may be integrated into the processor cores 918 and/or the graphics processor circuitry 912. In some embodiments, all or a portion of the bus 916 may be omitted and the components are coupled directly to each other using suitable wired or wireless connections.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

In various implementations, the computing device may be a laptop, a netbook, a notebook, an ultrabook, a smartphone, a tablet, a personal digital assistant (PDA), an ultra-mobile PC, a mobile phone, a desktop computer, a server, a set-top box, an entertainment control unit, a digital camera, a portable music player, or a digital video recorder. The computing device may be fixed, portable, or wearable. In further implementations, the computing device may be any other electronic device that processes data or records data for processing elsewhere.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Some embodiments pertain to Example 1 that includes an apparatus comprising one or more processors to receive a first request from an application to access one or more cryptographic keys from a cloud key vault, transmit the first request to the cloud key vault, receive the cryptographic keys from the cloud key vault, provide access to the one or more cryptographic keys to the application and store the one or more cryptographic keys within a trusted execution environment.

Example 2 includes the subject matter of Example 1, wherein the one or more processors to transmit an acknowledgement to the cloud key vault indicating that the one or more cryptographic keys have been stored in the trusted execution environment.

Example 3 includes the subject matter of Examples 1 and 2, wherein the one or more processors to further receive a second request from the application to access the one or more cryptographic keys from the cloud key vault and transmit the second request to the cloud key vault.

Example 4 includes the subject matter of Examples 1-3, wherein the one or more processors to further receive a redirected key access request from the key vault.

Example 5 includes the subject matter of Examples 1-4, wherein the one or more processors to further retrieve the one or more cryptographic keys from the trusted execution environment and provide access to the one or more cryptographic keys to the application.

Example 6 includes the subject matter of Examples 1-5, wherein the one or more processors to further to transmit an authentication request to a domain controller and receive a key access token from the domain controller.

Example 7 includes the subject matter of Examples 1-6, wherein the first request is transmitted to the cloud key vault with the key access token.

Some embodiments pertain to Example 8 that includes an apparatus comprising one or more processors to receive a first request from an application at a client to access one or more cryptographic keys, transmit the one or more cryptographic keys to a key vault client at the client, and set a flag indicating that the one or more cryptographic keys have been stored within a trusted execution environment at the client.

Example 9 includes the subject matter of Example 8, wherein the one or more processors further to receive an acknowledgement from the key vault client indicating that the one or more cryptographic keys have been stored within the trusted execution environment.

Example 10 includes the subject matter of Examples 8 and 9, wherein the one or more processors further to receive a second request from the application to access the one or more cryptographic keys and determine whether the flag has been set in response to receiving the second request.

Example 11 includes the subject matter of Examples 8-10, wherein the one or more processors further to redirect the second request to the key vault client upon a determination that the flag has been set.

Some embodiments pertain to Example 12 that includes a method comprising receiving a first request from an application to access one or more cryptographic keys from a cloud key vault, transmitting the first request to the cloud key vault, receiving the cryptographic keys from the cloud key vault, providing access to the one or more cryptographic keys to the application and storing the one or more cryptographic keys within a trusted execution environment.

Example 13 includes the subject matter of Example 12, further comprising transmitting an acknowledgement to the cloud key vault indicating that the one or more cryptographic keys have been stored in the trusted execution environment.

Example 14 includes the subject matter of Examples 12 and 15, further comprising receiving a second request from the application to access the one or more cryptographic keys from the cloud key vault, transmitting the second request to the cloud key vault and receiving a redirected key access request from the key vault.

Example 15 includes the subject matter of Examples 12-14, further comprising retrieving the one or more cryptographic keys from the trusted execution environment and providing access to the one or more cryptographic keys to the application.

Example 16 includes the subject matter of Examples 12-15, further comprising transmitting an authentication request to a domain controller; receiving a key access token from the domain controller and transmitting the key access token to the cloud key vault with the first request.

Some embodiments pertain to Example 17 that includes at least one computer readable medium having instructions stored thereon, which when executed by one or more processors, cause the processors to receive a first request from an application at a client to access one or more cryptographic keys, transmit the one or more cryptographic keys to a key vault client at the client and set a flag indicating that the one or more cryptographic keys have been stored within a trusted execution environment at the client.

Example 18 includes the subject matter of Example 17, having instructions stored thereon, which when executed by one or more processors, further cause the processors to receive an acknowledgement from the key vault client indicating that the one or more cryptographic keys have been stored within the trusted execution environment.

Example 19 includes the subject matter of Examples 17 and 18, having instructions stored thereon, which when executed by one or more processors, further cause the processors to receive a second request from the application to access the one or more cryptographic keys and determine whether the flag has been set in response to receiving the second request.

Example 20 includes the subject matter of Examples 17-19, having instructions stored thereon, which when executed by one or more processors, further cause the processors to redirect the second request to the key vault client upon a determination that the flag has been set.

Some embodiments pertain to Example 21 that includes at least one computer readable medium having instructions stored thereon, which when executed by one or more processors, cause the processors to transmit the first request to the cloud key vault, receive the cryptographic keys from the cloud key vault, provide access to the one or more cryptographic keys to the application and store the one or more cryptographic keys within a trusted execution environment.

Example 22 includes the subject matter of Example 21, having instructions stored thereon, which when executed by one or more processors, further cause the processors to transmit an acknowledgement to the cloud key vault indicating that the one or more cryptographic keys have been stored in the trusted execution environment.

Example 23 includes the subject matter of Examples 21 and 22, having instructions stored thereon, which when executed by one or more processors, further cause the processors to receive a second request from the application to access the one or more cryptographic keys from the cloud key vault, transmit the second request to the cloud key vault; and receive a redirected key access request from the key vault.

Example 24 includes the subject matter of Examples 21-23, having instructions stored thereon, which when executed by one or more processors, further cause the processors to retrieve the one or more cryptographic keys from the trusted execution environment and provide access to the one or more cryptographic keys to the application.

The embodiments of the examples have been described above with reference to specific embodiments. Persons skilled in the art, however, will understand that various modifications and changes may be made thereto without departing from the broader spirit and scope as set forth in the appended claims. The foregoing description and drawings are, accordingly, to be regarded in an illustrative rather than a restrictive sense.

What is claimed is:

1. An apparatus comprising:
    one or more processors executing a virtual machine to receive a request from an application to access one or more cryptographic keys from a cloud key vault, receive a key access token from a domain controller, determine whether a flag has been set indicating that the one or more cryptographic keys are stored within a trusted execution environment, direct the request to a local key vault client upon determining that the flag has been set and transmit the request including the key access token to the cloud key vault upon determining that the flag has not been set.

2. The apparatus of claim 1, wherein the virtual machine further to retrieve the one or more cryptographic keys from the trusted execution environment and provide access to the one or more cryptographic keys to the application.

3. The apparatus of claim 1, wherein the virtual machine further to perform key provisioning upon determining that the flag has not been set.

4. The apparatus of claim 3, wherein the key provisioning comprises receiving the cryptographic keys from the cloud key vault, providing access to the one or more cryptographic keys to the application, storing the one or more cryptographic keys within the trusted execution environment and setting the flag.

5. The apparatus of claim 4, wherein the virtual machine to transmit an acknowledgement to the cloud key vault indicating that the one or more cryptographic keys have been stored in the trusted execution environment.

6. The apparatus of claim 4, wherein the virtual machine further to transmit an authentication request to the domain controller to verify the application and receive the key access token from the domain controller.

7. The apparatus of claim 6, wherein the domain controller defines access rights of the application.

8. A method comprising:
    receiving a request from an application to access one or more cryptographic keys;
    receiving a key access token from a domain controller;
    determining whether a flag has been set indicating that the one or more cryptographic keys are stored within a trusted execution environment;
    directing the request to a local key vault client upon determining that the flag has been set; and
    transmitting the request including the key access token to a cloud key vault upon determining that the flag has not been set.

9. The method of claim 8, further comprising:
    receiving the cryptographic keys from the cloud key vault;
    providing access to the one or more cryptographic keys to the application;
    storing the one or more cryptographic keys within the trusted execution environment; and
    setting the flag.

10. The method of claim 9, further comprising transmitting an acknowledgement to the cloud key vault indicating that the one or more cryptographic keys have been stored in the trusted execution environment.

11. The method of claim 8, further comprising:
    retrieving the one or more cryptographic keys from the trusted execution environment; and
    providing access to the one or more cryptographic keys to the application.

12. The method of claim 9, further comprising:
    transmitting an authentication request to the domain controller.

13. The method of claim 12, wherein the domain controller defines access rights of the application.

14. At least one non-transitory computer readable medium having instructions stored thereon, which when executed by one or more processors, cause the processors to:
    receive a request from an application to access one or more cryptographic keys from a cloud key vault;
    receive a key access token from a domain controller;
    determine whether a flag has been set indicating that the one or more cryptographic keys are stored within a trusted execution environment;
    direct the request to a local key vault client upon determining that the flag has been set; and
    transmit the request including the key access token to the cloud key vault upon determining that the flag has not been set.

15. The non-transitory computer readable medium of claim 14, having instructions stored thereon, which when executed by one or more processors, further cause the processors to transmit an acknowledgement to the cloud key vault indicating that the one or more cryptographic keys have been stored in the trusted execution environment.

16. The non-transitory computer readable medium of claim 14, having instructions stored thereon, which when executed by one or more processors, further cause the processors to:
   receive the cryptographic keys from the cloud key vault;
   provide access to the one or more cryptographic keys to the application;
   store the one or more cryptographic keys within the trusted execution environment; and
   set the flag.

17. The non-transitory computer readable medium of claim 16, having instructions stored thereon, which when executed by one or more processors, further cause the processors to transmit an authentication request to the domain controller.

18. The non-transitory computer readable medium of claim 17, wherein the domain controller defines access rights of the application.

19. The non-transitory computer readable medium of claim 14, having instructions stored thereon, which when executed by one or more processors, further cause the processors to:
   retrieve the one or more cryptographic keys from the trusted execution environment; and
   provide access to the one or more cryptographic keys to the application.

* * * * *